United States Patent Office 3,432,658
Patented Mar. 11, 1969

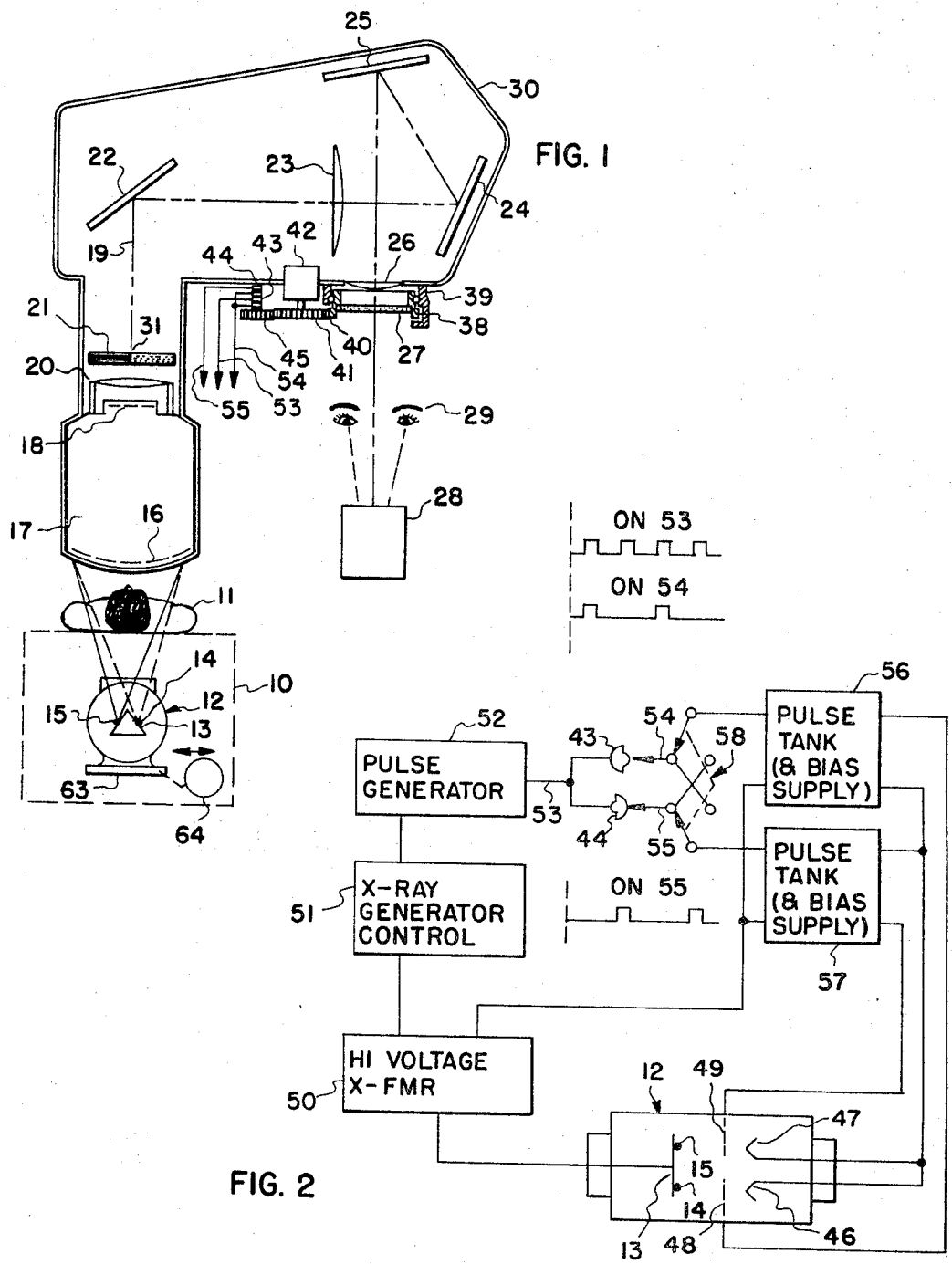

3,432,658
STEREOSCOPIC X-RAY APPARATUS EMPLOY-
ING IMAGE CONVERTING AND POLARIZ-
ING MEANS
Joseph G. Quinn, Milwaukee, Wis., assignor to General
Electric Company, a corporation of New York
Filed May 26, 1966, Ser. No. 553,063
U.S. Cl. 250—60                                  10 Claims
Int. Cl. H01j 37/22; G01n 23/04

ABSTRACT OF THE DISCLOSURE

Successive X-ray images are taken at slightly different angles through an object and are converted to light images on the phosphor of an image intensifier. A stationary orthogonal polarizer and a rotating analyzer are interposed in the image path between the phosphor and the eyes of the observer so that each eye sees images which have been polarized differently. Retention by the eyes of the successive images gives the impression of viewing the object from different angles simultaneously, in which case a stereoscopic effect is produced. The observer does not have to wear polarizing glasses.

---

This invention relates to apparatus for stereoscopic viewing of an X-ray image that has been converted to an optical image.

Diagnostic X-ray studies may be conducted with X-ray image converter systems. These systems employ a tube that has an input photocathode or screen on which the X-ray image impinges and is converted to an electron image and to a bright optical image which appears on an output screen. The output screen is a phosphor that is excited to fluorescence by accelerated electrons. The optical image is directed with an objective lens into a system of mirrors and lenses that magnify and redirect the image to the eyes of an observer. A properly designed optical system has an exit pupil of such width as to permit the observer to move his head through a reasonable distance without losing sight of the image. Thus, the observer, who is usually a physician, should be able to view the image quite comfortably and at the same time perform medical procedures on the subject who may be lying on an X-ray table. In the viewing system just outlined, however, the image that is seen by the observer is flat or two dimensional and for that reason has limited information content.

Some medical procedures may be performed more effectively if the physician is able to perceive depth in the patient, instead of a flat image. For example, cardiologists frequently perform a procedure which involves guiding a thin catheter from a perforation in a limb through a part of the vascular system to the chambers of the subject's heart. This involves directing the tip of the catheter through a devious route and requires that bends and loops be imparted to the catheter to facilitate its advancement. This may be done most easily under stereoscopic observation.

One of the factors that permits perception of an object in three dimensions is the horizontal spacing of the eyes which allows the object to be seen from slightly different aspects or angles by each eye. Most things that are encountered in everyday experience are observed with the observer's head upright and the eyes lying on a straight line that is nominally horizontal. Thus, viewing in this way is a natural state to which one's eyes become accommodated. Viewing with the head turned so that one eye is above the other is somewhat unnatural and results in a diminution of depth perception.

Accordingly, it is an object of the present invention to provide a stereoscopic X-ray viewing system that permits viewing of an X-ray image in the viewer's natural mode of optical visualization; that is, that permits seeing an image as if the observer were looking at it in a natural and direct manner.

Another object is to provide a stereoscopic viewing system that maximizes the head movement freedom of the observer to afford him comfort and convenience with respect to seeing the X-ray image at the time he is performing a medical procedure on the subject.

Another object is to provide a stereoscopic viewing system that may be incorporated in both new and existing X-ray image converter systems.

Still another object of the invention is to permit the physician to view an upright image regardless of the side of the X-ray table from which he works. To achieve this end, electric controls are provided for inverting or, stated in another way, transposing or reversing the image so that viewing will be more natural if the head of the subject is at one end of the X-ray table or the other or if the subject is lying on his back or front. An additional advantage of being able to invert the image is that it yields an apparent doubling of depth perception when the images are switched back and forth during an examination, thus making easier the perception of small differences in depth.

A second phenomenon involved in depth perception is that known as motion parallax. In everyday experience this comes about by motion of the object, the observer, or both. In a shadowgraph presentation, it can be simulated by movement of the X-ray tube or other source of radiation, but movement of the observer will not cause simulation of motion parallax. Movement of the subject does produce this phenomenon, but it is impractical to rock or oscillate the subject while a physician is doing something as delicate as attempting to position a catheter internally, for instance.

Accordingly, an object of this invention is to achieve simulation of motion parallax by rocking, oscillating, or reciprocating the radiation source which, in an illustrative embodiment, is an X-ray tube. For convenience, the term reciprocating will be used hereafter as synonymous with any type of radiation source movement. This motion of the X-ray source enhances depth perception by sequentially producing views of the internal structure of the subject from various angles.

Achievement of the foregoing and other more specific objects will appear from time-to-time throughout the course of the following specification.

In general terms, the present invention contemplates locating the subject of an X-ray examination on an X-ray table. Underneath the table top are either two X-ray tubes or a single X-ray tube with one anode or target and two focal spots. The focal spots are spaced from each other in either case. There are two cathodes and a control grid associated with each. The control grids permit pulsing of the X-ray tube or, in other words, energizing and extinguishing radiation from each focal spot in sequence. The spaced apart focal spots project radiation through a subject in slightly different aspects to form consecutive X-ray images that impinge on the input screen of the image converter tube and that are slightly displaced from each other on the input and output screens. As explained above, the tube converts the X-ray images to optical images which appear in sequence on a single output screen or phosphor at the end of the tube which is opposite from the input end.

An objective lens is located on the axis of the output screen for directing the image therefrom through an optical path to an observer. In a preferred embodiment of the invention, a stationary light polarizer is located adjacent the objective lens so that the images must pass through it on their way through the optical path. The polarizer may be a disk that has one-half of its area adapted to polarize the electric vectors of the light image in one direction and the other half adapted to polarize orthogonally or in a direction at right angles to the first. Farther down the optical path there is a rotary analyzer of polarized light, the location of which is not critical. The analyzer polarization is unidirectional. Hence, when the analyzer is rotated on the optical axis of the system, the consecutive, slightly displaced images appearing on the phosphor are alternately and sequentially transmitted and extinguished by the analyzer. In reality, either the polarizer or analyzer can be made rotatable if the other is stationary. The arrangement of the optical system is such that the image intercepted by one eye of the observer is seen and then extinguished after which the other eye sees the alternate image which is followed by extinction. The repetition rate of the X-ray pulses and the rotational speed of the analyzer are so chosen that the sequential images are presented by way of the eyes to the mind at a rate which is above the threshold of flicker perception, thus permitting the mind to fuse or reconstruct the three dimensional image.

The means for inverting the image are electrical and involve reversing the pulse sequence of the X-ray tubes in relation to the rotational positions of the analyzer so that what may have been seen originally with one eye is seen with the other eye and vice versa.

An illustrative embodiment of the invention as it applies to medical usage will now be described in reference to the drawing in which:

FIGURE 1 is a schematic representation of an X-ray image converter system in which the new stereoscopic viewing features are incorporated;

FIGURE 2 is a block diagram of the electrical circuitry used in practicing the invention;

Figure 3:
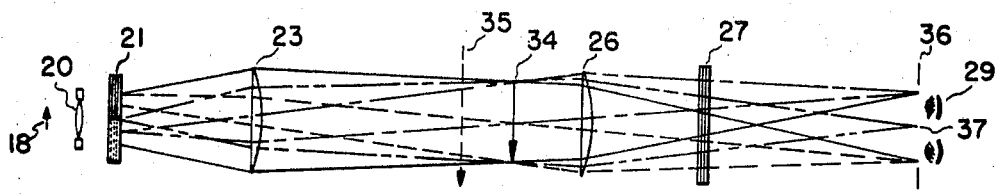
FIGURE 3 is an optics diagram for facilitating explaining the invention.

In FIGURE 1 an X-ray table 10 is symbolized by broken lines formed as a rectangle. A patient or subject 11 is recumbent on the table top with his head at the near end as pictured and his legs projecting away or perpendicular to the plane of the paper. Within X-ray table 10 is an X-ray tube 12 which has a target 13 on which two spaced-apart X-ray focal spots 14 and 15 may be generated. Conical beams of radiation, defined by pairs of broken and solid lines, respectively, emanate from each of the focal spots 14 and 15, pass through an adjustable collimator, not shown, then pass through the subject 11 and impinge on the input screen 16 of an image amplifier tube which is generally designated 17. The focal spots 14 and 15 are preferably separated by two to four inches. The reasons and method for alternately and sequentially energizing and de-energizing focal spots 14 and 15 will be described in detail later, but for convenience, the explanation will proceed as if there were only a single focal spot. Thus, the X-ray image formed on input screen 16 is ultimately converted to a bright optical image on output screen 18 which is located at the upper end of image tube 17. The image from the ouput screen is directed along an optical axis 19 by an objective lens 20 which in an actual case is about four inches in diameter and is located so that the screen 18 is approximately at the focal plane of the lens. The effect, of course, is to project an image beam along optical axis 19.

Next in the optical path is the orthogonal polarizer 21, but this can be neglected for the moment until the rudiments of the image converter system are outlined. The image proceeds and is directed to a diagonal mirror 22 which changes its direction ninety degrees after which it passes through a lens 23. Subsequently, it undergoes consecutive reflections on mirrors 24 and 25 from the latter of which it is directed through a lens 26, through analyzer 27, and finally to a diagonal viewing mirror 28.

As will be explained in greater detail later, lens 23 produces a real, inverted image which is located inside the focal length of next ensuing lens 26 so that the latter acts as a magnifier and presents a virtual image to the eyes 29 of the observer who is looking directly into viewing mirror 28. As shown in FIGURE 1, the reflective surface of viewing mirror 28 is on the backside of the mirror so that an observer's eyes 29 are looking in the direction that they would be if the observer were looking from the foot end of the subject 11 or from the far end of X-ray table 10.

Objective lens 20, polarizer 21, lens 23, and mirrors 22, 24, and 25 are all located in a light-tight housing 30. Lens 26 is preferably located in the bottom of housing 30 and rotatable analyzer 27, in accordance with the invention, is preferably located outside of the housing between lens 26 and viewing mirror 28, although the analyzer may be anywhere in the optical path.

The basic system just outlined would, by itself, only permit a flat, two dimensional image to be observed in mirror 28. As explained earlier, in order to provide for stereoscopic viewing, it is necessary to present images that are generated in close succession by X-ray sources at slightly different angles. In accordance with the invention, the focal spots 14 and 15 in the X-ray tube are energized and extinguished sequentially so that the consecutive images taken from a slightly different angle through the subject appear on output phosphor 18 with any given point in one image being displaced slightly from the same point in the next image in a pair. If these images are presented to the optical system in both eyes 29 of the observer simultaneously, no three-dimensional effect will be perceived. However, by using a stationary polarizer 21 and a rotating analyzer 27, the images are projected down the same optical path and sequentially presented to alternate eyes so that the mind of the observer may fuse them and thereby reconstruct the picture three-dimensionally. One suitable material for both the polarizer and analyzer is type HN-38 polarizing filters obtainable from the Polaroid Corporation. The manner in which the polarizer 21 and analyzer 27 coact with each other to produce this effect will now be described in greater detail in reference to FIGURES 4A–D.

Figure 4:
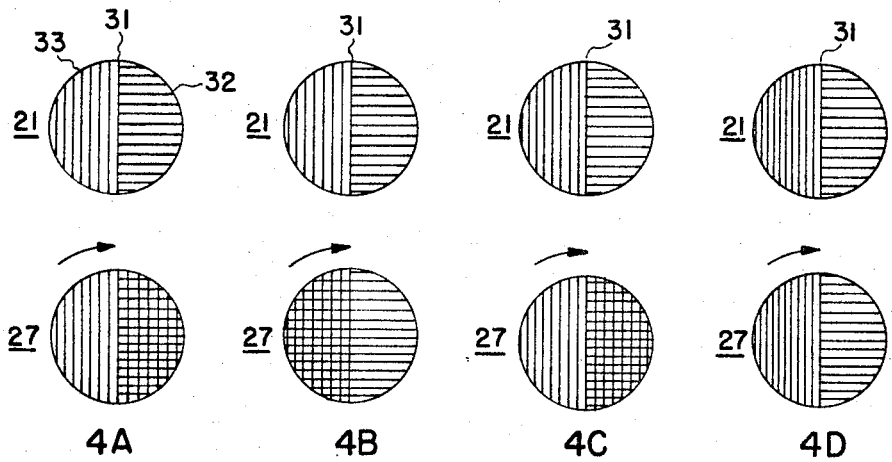
FIGURE 4 depicts the polarizer with respect to different angular positions that may be assumed by the analyzer.

In FIGURE 4, one may see that the polarizer 21 is made in two parts or sections that are adapted to polarize light orthogonally and are separated by a dividing line 31. A plurality of parallel lines indicates that the right half 32 of the polarizer is oriented to polarize light with its electric vector in one direction and the left half 33 to polarize light with its electric vector in a direction that is at a right angle to the first. The analyzer 27, on the other hand, is polarized in a single direction as suggested by the uniformly spaced unidirectional parallel lines. As a result, only components of the vectors that are parallel to the orientation of the analyzer will pass through it. If the analyzer 27 is aligned on a common optical axis with the polarizer 21 as in FIGURE 4A, and assuming that the image is coming from behind polarizer 21 and is being viewed from in front of analyzer 27, it is seen that the left half of the analyzer 27 passes the light image and the right half blocks it out as symbolized by the criss-cross lines in the right half. Thus, if one is observing an image through analyzer 27 with his eyes in the exit pupil plane 36 of the optical system, see FIGURE 3, and if the observer's eyes are substantially horizontal and on opposite sides of the apparent dividing line 31, the left eye will see an image and the image to the right eye will be blocked.

FIGURE 4B shows the effect of holding the polarizer 21 stationary and rotating the analyzer 27 through ninety degrees from its FIGURE 4A position, in which case the left eye is blocked, as symbolized by criss-crossing on the left half of analyzer 27, and the image is transmitted to the right eye. Rotating the analyzer through an additional right angle as in FIGURE 4C, again permits the left eye to see the image and the right eye to be blocked. And as the revolution is completed as in FIGURE 4D, the left eye is blocked and the right eye sees again. In reality, transmission and cut-off are very sharp because, as is known, intensity transmission by such polarizing filter combinations varies inversely as the square of the cosine of the angle between the directions of polarization of one polarizer section and the analyzer. In a commercial embodiment, the analyzer 27 is rotated at 900 revolutions per minute which means that two images are presented to the left eye and two to the right eye for each revolution, making a total of 1,800 images to each eye each minute. This is thirty images per second which is a frequency above that required for flicker fusion. With X-ray pulses of four millisecond duration, maximum transmitted intensity at the instant when analyzer 27 was plus or minus 10.8 degrees, approximately, from maximum blackout was only 3.5% of the intensity transmitted during maximum transmission. With one millisecond X-ray pulses and plus or minus 2.7 degrees of deviation, undesired transmission was only 0.22% of the intensity transmitted at the time of maximum transmission. The large intensity differences between the wanted and unwanted images to a given eye over a reasonable deviation angle permits analyzer 27 to be driven at a constant angular velocity, instead of intermittently, to yield satisfactory viewing.

Further details on the optical system and on the location of polarizer 21 and analyzer 27 will now be considered in connection with FIGURE 3. In this figure, the optical system shown in FIGURE 1 is unfolded and the mirrors are omitted because they do nothing more than change the direction of the image beam. Disregarding orthogonal polarizer 21 for the moment, it will be seen that objective lens 20 intercepts the slightly displaced images which are represented by a single arrow 18 on the output phosphor because the images nearly coincide. Even though the images on ouput phosphor 18 are taken from slightly different aspects, they do appear in approximately the same position and are projected through the optical system similarly. These images are in reality, the objects as that term is used in optical nomenclature. A real and inverted image of the object is represented by the arrowheaded solid line 34 in FIGURE 3. This real image is formed by lens 23 and lies within the focal length of magnifying lens 26. As a result, an observer who places his eyes 29 in the approximate plane of the exit pupil 36 looks down the optical path to see a magnified, virtual image 35.

In FIGURE 3, the paths of some of the limiting or defining rays are drawn. It will be observed that polarizer 21 is located in such a place that if one traces the rays from the midpoint 37 in exit pupil 36 back through the optical system, that all of the optical information coming from the right half of the polarizer 21 as shown, will be intercepted by the left eye of an observer who is looking into the system as illustrated, and all the information seen by the right eye will come from the left half of polarizer 21.

Once the light for either eye is polarized orthogonally by polarizer 21, that light maintains its polarization down the optical path regardless of how it may be mixed with light of the converse polarization. Therefore, regardless of where in the optical path the analyzer 27 is placed, provided it is properly oriented angularly, it will block unwanted light images only and pass images of the orthogonal polarization without any effect other than a slight loss of intensity due to transmission characteristics of the polarizer materials. Thus, by way of illustration, analyzer 27 is located outside of magnifying lens 26 for convenience.

The components for rotating analyzer 27 synchronously with alternate and sequential energization of the focal spots in the X-ray tube will now be described in reference to FIGURE 1. In this embodiment, analyzer 27 is circular and mounted in the recess of the inner race 38 of a ball bearing construction. The outer race 39 of the bearing may be fastened to the bottom of housing 30 by any suitable means. Inner race 38 is provided with a flanged-edge 40 that has gear teeth on its periphery in this example. These teeth mesh with a pinion 41 which is operated by a synchronous motor 42. The components just described merely typify a method for rotating the analyzer 27. In a commercial embodiment, for instance, a belt and pulley arrangement is substituted for gears for the sake of more quiet operation. Rotational speed of the analyzer in a practical example is 900 revolutions per minute.

Motor pinion 41 is meshed with another gear 45 for the purpose of rotating two commutator switches 43, 44 which are mounted on the same shaft as gear 45. These commutators make and break electric circuits in synchronism with the angular positions of analyzer 27 and their purpose is to gate the firing of the proper X-ray tube focal spots in correspondence with the analyzer position. Any suitable mechanical, electronic, or electrical synchronizing switches may be substituted for the commutator switches.

Commutators 43 and 44 are also shown in FIGURE 2 in connection with which the general features of the electrical circuitry will be described. In this figure, dual focal spot X-ray tube 12, which is normally located inside the X-ray table 10, is depicted diagrammatically and is seen to comprise a single target 13. The tube has two cathodes 46 and 47 and respective control grids 48 and 49. The grids 48 and 49 ordinarily have a negative bias voltage impressed on them. The cathode-to-anode voltage is adjustable usually up to 150 kilovolts. Since the target or anode 13 is positive with respect to cathodes 46 and 47, conduction will occur between cathodes and anode whenever the negative bias on one or the other of the grids is overcome with respect to its associated cathode. This method of pulsing the cathodes sequentially is the same as that used for many years in connection with synchronizing the X-ray pulses with a cine camera when recording nonstereo images from an image intensifier except that two cathodes are involved in this case instead of the usual one cathode.

A direct or rectified voltage is supplied to X-ray tube target 13 from a conventional high voltage X-ray transformer 50. This is under control of an X-ray generator control 51 which facilitates controlling the X-ray tube current as well as the voltage. The details of the controls need not be discussed because they are well-known to those who are concerned with making X-ray apparatus.

A pulse generator 52 is provided. In the present embodiment, the pulse generator is synchronized with power line frequency and is adapted to produce a series of square waveform pulses at a frequency of sixty pulses per second. These appear on a line 53 which connects with one side of each commutator 43 and 44. The commutators are driven synchronously and at such speed that alternate pulses in the series are sent down lines 54 and 55. Thus, the repetition rate of the pulses on each of the last-named lines is thirty per second. These pulses are supplied sequentially to pulse tank and bias supplies 56 and 57, respectively, through a double-throw, double-pole reversing switch 58. As shown, pulses going through commutator 43 are supplied to tank 56 and those going through commutator 44 are supplied to tank 57. When switch 58 is transferred, pulses from each of the commutators are transferred to the opposite pulse tank as can be seen by inspection of the drawing.

As shown, the output pulses from pulse tank and bias supply 56 are impressed on grid 48 to overcome its bias and permit an electron beam from cathode 46 to anode 13. This generates an X-ray focal spot at 14. Likewise, the pulses from tank 57 overcome the bias on grid 49, in sequence with the other grid, to generate X-ray pulses at focal spot 15. In a commercial embodiment of the invention, the pulse widths or X-ray tube conduction intervals are about four milliseconds for the case when the analyzer is rotated at 900 revolutions per minute.

It should be observed that when one pulse of X-ray is produced, that analyzer 27 is in such alignment with polarizer 21 that an image is presented to one eye of the observer. The analyzer 27 then continues its rotation almost ninety degrees when the focal spot of the X-ray tube is caused to generate X-rays at which time the analyzer 27 and polarizer 21 are in such alignment as to present an image to the other eye of the observer. As explained earlier, because these images are presented at slightly different viewing angles and in close succession, the eyes perceive them and the mind fuses them as is the case when one looks at an ordinary object that has depth as well as width and height.

Earlier in this description emphasis was placed on the desirability of arranging the system so that the observer would find maximum correspondence between looking at the artificially created image and looking directly and naturally at the object or body under observation. Thus, in FIGURE 1 the observer is standing at the foot end of the subject 11 facing viewing mirror 28 which is reflective on its backside as shown. There are occasions, however, when the physician works on the opposite side of X-ray table 10 in which case the image converter housing 30 and viewing mirror are swung through a semi-circle to position the mirror 28 to the left of the table 10. Thus, the viewing direction of the physician would be opposite from what it was with respect to the subject. Preferably, however, the head of the patient should be at the opposite end of the table to yield an image with the head up. But then, the right eye would see what should be seen by the left eye and, vice versa, resulting in an inverse perception of depth. According to the invention, the normal relation may be restored by merely transferring the double-pole reversing switch 58 from the position in which it is shown to its alternate position, see FIGURE 2, so that the firing sequence of the X-ray tube is reversed as explained earlier. Prior to transferring switch 58, the firing sequence may have been such that the left focal spot 15 in FIGURE 1 permitted the right eye to see, and firing of the right focal spot 14 permitted the left eye to see. After transferring the switch 58, firing focal spot 15 would permit the left eye to see and firing spot 14, the right eye. Thus, what was formerly seen on the left is now seen on the right, which amounts to inverting or transposing the apparent depth direction of the mentally constructed image. Hence, if one is observing a subject in which there is a solid object imbedded and which is tilted at one angle, operation of switch 58 will cause the object to tilt at an angle that is opposite and equal to the former angle that it made with a line that is normal to the plane of viewing.

In a commercial embodiment of the invention, the viewing mirror 28 is turned at an angle of about thirty degrees with respect to a plane that is normal to the drawing as in FIGURE 1. This viewing angle and, perhaps some other arbitrarily chosen angles, makes it more convenient for the physician to perform medical procedures on the subject during stereoscopic viewing. Doing nothing more than turning mirror 28 on its vertical axis for this purpose would minimize the latitude of head movement for the observer because it effectively rotates the dividing line between left and right bundles of light about a point near the center of separation of the observer's eyes. To maintain the same latitude of head movement, the observer would have to tilt his head through the same angle through which he rotates the mirror 28. Also if the mirror is rotated without rotating the X-ray tube 12, the perceived images are not only displaced horizontally with respect to the eyes, but also somewhat vertically. Turning polarizer 21 through the angle of mirror 28 rotation does not solve the problem because then the orthogonally or oppositely polarized rays from the polarizer do not impinge on the first mirror 22 as rays that are parallel and perpendicular, respectively, to a plane that is normal to the surface of first mirror 22. This causes phase shift in the electric vectors, resulting in elliptical polarization of the light that is projected along the optical path to the exit pupil. A further consequence is a reduced capability for the system to extinguish undesired information because analyzer 27 analyzes only orthogonally polarized light and not elliptically polarized light.

Figure 5:
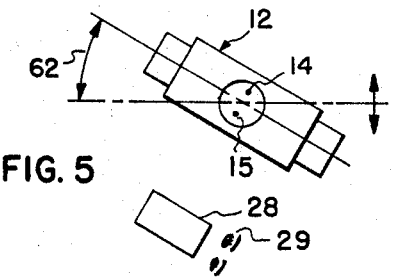
FIGURE 5 is a plan view of an X-ray tube that has its longitudinal axis at an angle with the axis of an X-ray table in connection with which figure a particular feature of the invention will be described.
Figure 6:
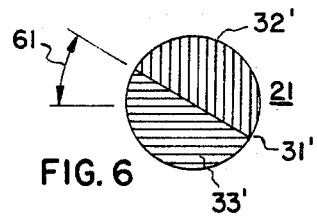
FIGURE 6 shows an alternative form of light polarizer that may be used when the X-ray tube is at an angle with the X-ray table as in FIGURE 5.

An arrangement for solving the aforementioned problems and for permitting directing viewing mirror 28 at a desired angle with respect to a plane that is longitudinal through the subject and normal to the plane of the drawing in FIGURE 1 will now be discussed in reference to FIGURES 5 and 6, primarily. FIGURE 6 shows the sections 32' and 33' of polarizer 21' polarized orthogonally with respect to each other but at angle designated 61 with respect to apparent dividing line 31'. The numerical value of angle 61 in degrees corresponds with whatever angle viewing mirror 28 is turned with respect to a plane normal to the drawing. It also corresponds with the same angle 62 through which the X-ray tube 12 is turned with respect to the longitudinal axis 60 of X-ray table 10. When polarizer 21' is installed in place of 21 in FIGURE 1, the dividing line 31' would skew to the right when looked at from the top instead of being normal to the plane of the drawing as is dividing line 31. Moreover, if dividing line 31' is projected vertically downward it will coincide with the skewed longitudinal axis of X-ray tube 12 as shown in FIGURE 5. Thus, dividing line 31', the axis of X-ray tube 12 and viewing mirror 28 are all turned at the same angle and it should be observed that the X-ray tube focal spots 14 and 15 in FIGURE 5 are also askew. However, if two X-ray tubes with individual focal spots were used, they would not have to be turned, but could be offset longitudinally such that a line through their focal spots would make the required angle with the center line of X-ray tube 10.

When the dividing line 31' of polarizer 21' is askew as discussed in the preceding paragraph, one set of orthogonal vectors, such as those from section 33' of the polarizer, will be normal to the plane of the drawing as in FIGURE 1, in which case they will impinge flatly on first mirror 21 and be reflected without rotation or elliptical polarization. The other set of orthogonal vectors, such as from section 32', will be parallel to the plane of the drawing and horizontal so their left ends will strike diagonal mirror 22 first, causing them to undergo a 180 degree phase shift which is immaterial because a 180 degree shift does not affect the ability of analyzer 27 to transmit or block light at the desired time.

A feature of the invention for enhancing stereoscopic or depth perception will now be described. This involves reciprocal movement of the X-ray source such as tube 12 during viewing, at about twenty-five cycles per minute, preferably, and applies to either case when the axis of tube 12 is parallel with the longitudinal axis of X-ray tube 10 as in FIGURE 1 or when it is askew as suggested by FIGURE 5. To achieve this end, one may see in FIGURE 1 that the X-ray tube 12 is mounted on a support 63 which is shown schematically. The support 63 is connected with a motor driven crank and eccentric assembly 64 for reciprocating the tube 12 back and forth over a range of about two inches in a practical case. The motor is not shown. If two X-ray tubes were used, instead of one with dual focal spots, they would be situated jointly on mounting 63. The effect of reciprocation can also be achieved by rotating or rocking the X-ray tube in an oscillatory manner about its longitudinal axis through small angles. The theoretically most desirable thing to do would be to pendulate the X-ray tube from an apparent pivot point lying somewhere in the subject under investigation and preferably on or near a particular plane of interest. In any case, however, movement of the X-ray tube during stereoscopic viewing enhances depth perception and yields additional information to the physician.

In a commercial embodiment of the invention, polarizer 21 is mounted on a mechanism, not shown, for transferring it out of the optical path if direct viewing of a stereoscopic image is not desired. The mechanism has elements for rotating and fixing the polarizer 21 in order to align it with the optical system. When the polarizer is removed, either stereo or nonstereo pictures may be recorded on film, depending on whether or not both cathodes in the X-ray tube are used and assuming that the system is provided with the customary camera attachments. If direct observation of stereo is desired while film recording, the polarizer must remain in place.

An important practical and beneficial feature of the present invention is that the new stereoscopic viewing system can be adapted readily to existing image converter systems as well as to those of original manufacture. In the commercial design, the analyzer 27, its associated bearing structure, the motor, driving pulleys and commutators are all mounted on a chassis, not shown, that can be attached with some screws to the bottom of the image converter housing 30, immediately beneath magnifying lens 26. Polarizer 21 is also easy to install because the mechanism associated with it is relatively simple as a result of the polarizer being stationary as described. The principles of the invention are, nevertheless, equally applicable when the polarizer is mounted for rotation and the analyzer is stationary. Moreover, either the analyzer or polarizer may be adapted for orthogonal polarization.

Although a preferred embodiment of the invention has been described in such detail as to enable one skilled in the art to reproduce the invention, such description is intended to be illustrative rather than limiting, for the invention may be variously embodied and used for both medical diagnosis and industrial inspection applications and is to be limited only by interpretation of the claims which follow.

It is claimed:

1. Stereoscopic X-ray apparatus comprising:
(a) a source of two X-ray beams for projecting through an examination object to form X-ray images taken from different angles through the object,
(b) means for controlling the production of said beams alternately and sequentially to produce consecutive X-ray images,
(c) an image converter means located to receive the consecutive X-ray images and including an output screen which is adapted to display visible images that correspond with X-ray images,
(d) an orthogonal polarizer and an analyzer located in the same optical path to transmit the visible images to the eyes of an observer,
(e) the said analyzer and polarizer being relatively rotatable with respect to each other substantially about the axis of the optical path,
(f) the visible images being transmitted alternately and sequentially in dependence on the angular relationship between the analyzer and the orthogonal polarizer and synchronously with occurrence of the X-ray beams.

2. The invention set forth in claim 1 including:
(a) a lens system for magnifying and directing the visible images along an optical path from said polarizer to an exit pupil within which an observer may view the images,
(b) an objective lens near the said output screen for directing the consecutive images appearing thereon through both parts of the orthogonal polarizer and along the optical path of the lens system simultaneously,
(c) the polarizer means being located proximate to the objective lens such that some portion of the light emanating from substantially all parts of the image on the output screen will pass through the differently polarizing parts of the orthogonal polarizer means.

3. The invention set forth in claim 1 including:
(a) a subject supporting table having a longitudinal axis in the general direction of which the object is normally disposed,
(b) a first plane that intersects a line between the sources of the X-ray beams at a right angle, said first plane being at a predetermined angle of zero or other angle with said longitudinal axis of the table,
(c) the said orthogonal polarizer being stationary and having its differently polarizing parts separated by a dividing line which is also at said predetermined angle of the first plane with respect to said longitudinal axis of the table, the polarizer parts being adapted to polarize light orthogonally with respect to each other, but the polarization vectors of each part being at an angle with respect to said dividing line,
(d) a first mirror next in the optical path following the orthogonal polarizer for directing the images along the optical path,
(e) a viewing mirror in the same path for redirecting the images toward a position that may be occupied by the eyes of an observer,
(f) a plane through the viewing mirror that includes the line of sight also being substantially at the aforementioned predetermined angle with respect to said longitudinal axis of the table.

4. The invention set forth in claim 1 including:
(a) a movable support for said X-ray beam source,
(b) driving means coupled with the movable support and energizable for imparting reciprocating movement to the beam source during stereoscopic viewing, whereby to enhance depth perception at the option of an observer.

5. The invention set forth in claim 1 including:
(a) a commutating switch means having alternate conductive paths,
(b) means supporting said analyzer for rotation,
(c) a motor means coupled with the commutating switch means and the analyzer supporting means for rotating the last two named means in synchronism,
(d) the said X-ray source having cathodes and individual control grids associated therewith,
(e) sources of biasing voltage connected between each cathode and grid, respectively, to control generation of the X-ray beams,
(f) a pulse generator that produces a seires of pulses,
(g) circuitry including the commutating switch means for switching alternate pulses in the series of pulses separately to the control grids to overcome their bias voltage and generate the X-ray beams sequentially, whereby the visible images may be produced and transmitted to opposite eyes of an observer through the analyzer in synchronism with the alternate X-ray beams that are produced.

6. The invention set forth in claim 5 including:
(a) a reversing switch means having one pair of paths through which the alternate ones in the series of pulses are impressed on different grids,
(b) said reversing switch means being adapted for exchanging the paths whereby to interchange the pulse series to opposite grids,
(c) whereupon the time relationship of the production of the X-ray beams may be alternated with respect to the angular position of the analyzer, such that the images are presented in opposite sequence to the respective eyes of the observer for being perceived as an inverted image.

7. Apparatus for adapting an X-ray image converter to stereoscopic viewing of the optical images which are caused to appear on its output screen as a result of taking a rapid succession of X-ray views from slightly different angles through the same examination subject, said apparatus comprising:
 (a) an orthogonal polarizer adapted to be interposed in the optical path of the images,
 (b) an analyzer adapted to be interposed in said optical path in the line of sight between the polarizer and a position that may be taken by the eyes of an observer,
 (c) the said analyzer being adapted for rotation on an axis that is normal to its plane whereby to transmit a sequence of images in alternate succession to one eye position of the observer and then to the other and to extinguish conversely the images to one eye position and then the other, whereby the observer may perceive the images of the subject stereoscopically.

8. The invention set forth in claim 7 including:
 (a) means for supporting said analyzer for rotation,
 (b) a synchronous switch means adapted to be connected for controlling the production of X-ray beams on spaced-apart target areas of a stereoscopic X-ray source means,
 (c) motor means coupled for driving the synchronous switch means and analyzer means jointly, whereby to maintain synchronism between the production of the X-ray beams, their corresponding images and the angular position of the analyzer.

9. The invention set forth in claim 8 including:
 (a) a reversing switch adapted to be connected in circuit with each synchronous switch means and the stereoscopic X-ray source whereupon operation of said reversing switch will interchange control of the X-ray beams between synchronous switch means and whereby the order of presentation of the images to the respective eyes of an observer is reversed to cause apparent inversion of the image.

10. The invention set forth in claim 7 including:
 (a) means for moving the stereoscopic X-ray source reciprocally and transversely of an examination object whereby to enhance stereoscopic perception.

References Cited

UNITED STATES PATENTS

| | | | |
|---|---|---|---|
| 1,879,793 | 9/1932 | Chubb | 350—132 |
| 1,995,054 | 3/1935 | Chambers | 250—60 |
| 2,667,585 | 1/1954 | Gradstein | 250—61.5 |
| 2,729,138 | 1/1956 | Bernier | 350—132 X |
| 3,244,878 | 4/1966 | Stein et al. | 250—60 |

RALPH G. NILSON, *Primary Examiner.*

A. L. BIRCH, *Assistant Examiner.*

U.S. Cl. X.R.

350—132